United States Patent [19]
Borman

[11] 3,789,865
[45] Feb. 5, 1974

[54] LIQUID LEVEL CONTROL

[75] Inventor: August H. Borman, Farmington, Mich.

[73] Assignee: General Motors Corporation, Detroit, Mich.

[22] Filed: Sept. 8, 1972

[21] Appl. No.: 287,507

[52] U.S. Cl. .................. 137/122, 137/413, 137/563
[51] Int. Cl. ............................................. G05d 9/04
[58] Field of Search .... 137/120, 121, 122, 413, 563

[56] References Cited
UNITED STATES PATENTS

| | | | |
|---|---|---|---|
| 394,569 | 12/1888 | Gunckel | 137/122 |
| 993,628 | 5/1911 | Williams | 137/413 |
| 2,145,602 | 1/1939 | Kirgan | 137/413 |

Primary Examiner—Robert G. Nilson
Attorney, Agent, or Firm—Donald F. Scherer

[57] ABSTRACT

A liquid level control for maintaining a predetermined liquid level in a primary reservoir and permitting storage of excess fluid in a secondary reservoir. The fluid in the primary reservoir is delivered by a pump to a fluid operated system. Excess fluid which cannot be immediately utilized by the fluid system is returned via a valve to the primary reservoir. The primary reservoir has a level indicating device which operates the valve to control fluid return to the primary reservoir from the fluid system. When the fluid level in the primary system is above a predetermined level the valve is operated to discontinue flow to the primary reservoir and direct the fluid to be stored temporarily in the secondary reservoir.

3 Claims, 1 Drawing Figure

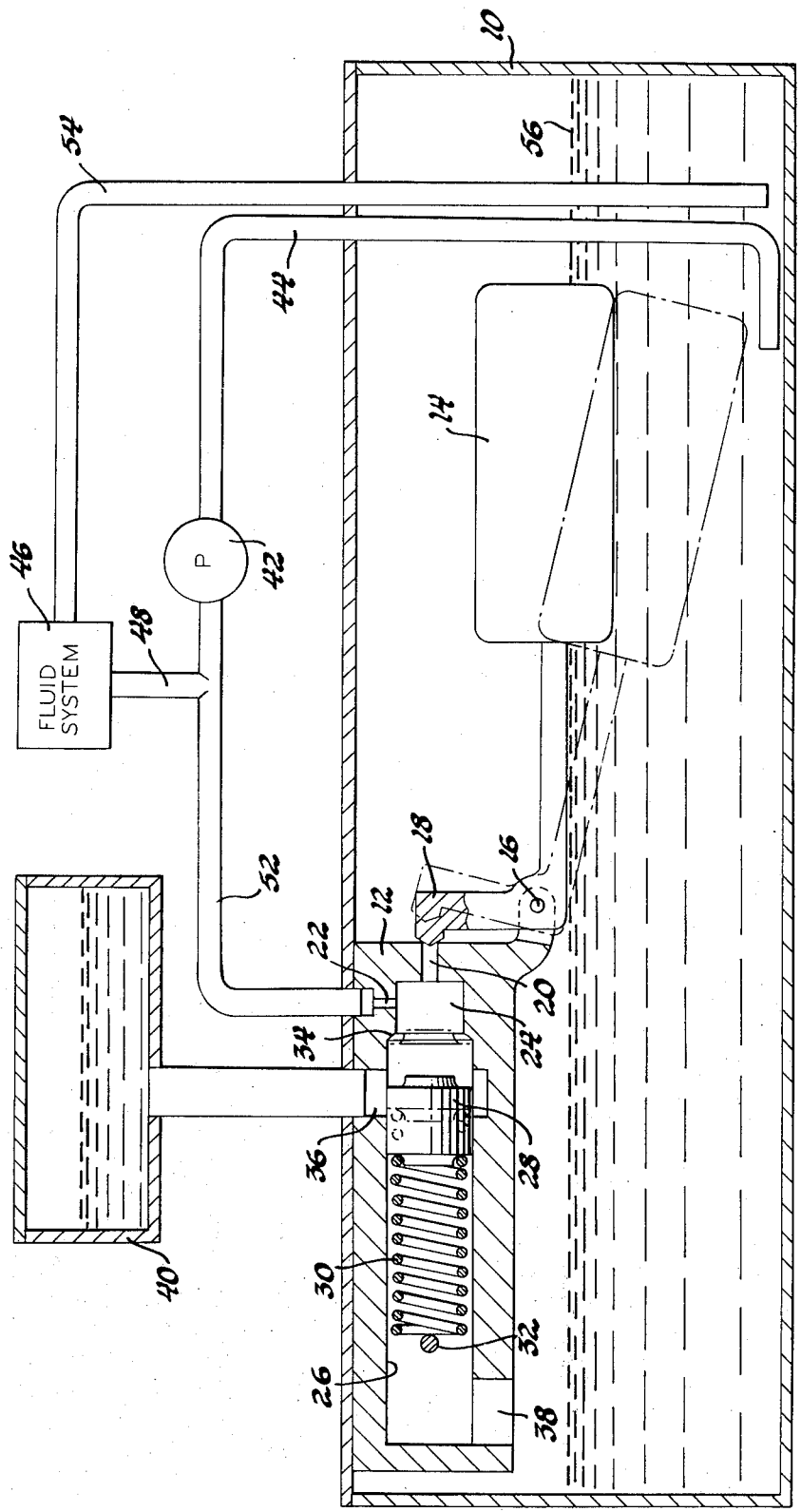

LIQUID LEVEL CONTROL

This invention relates to liquid level controls and more particularly to liquid level controls which control the temporary storage of fluid in a secondary reservoir.

In fluid systems used with automotive vehicles such as automatic transmissions, power steering systems and power brake systems a single reservoir may be used to store the fluid for all of the systems. When the vehicle systems are not operating or are operating at a steady state condition a large amount of fluid must be stored in the reservoir. Thus, a large reservoir is generally needed. However this reservoir is generally located in an area, such as the transmission sump, where space saving is critical. To reduce the size of the fluid reservoir the present invention utilizes a secondary reservoir to store the excess fluid. Prior to operation of the fluid systems the primary reservoir stores all of the fluid, however, after the fluid systems are initially operated the excess fluid is transferred to the secondary reservoir thus permitting the primary reservoir to be filled to a predetermined level wherein less than all of the system's total fluid is stored.

The present invention utilizes a liquid level control valve which closes the return passage from the fluid systems to the primary reservoir when the liquid level therein is above the predetermined value. When the desired fluid level is attained, the level control valve is closed whereby the returning fluid operates on a pressure sensitive valve to open the return line to the secondary reservoir to permit storage of the excess fluid therein. During continuing operation the liquid level control valve will open if the liquid level in the primary system falls below the predetermined level thereby reconnecting the return passage to the primary reservoir. If the liquid level in the primary reservoir should fall substantially below the desired level, the pressure sensitive valve controlling liquid flow to the secondary reservoir will also move such that the fluid in the secondary reservoir is connected with the primary reservoir to return the liquid level therein to the desired level.

It is, therefore, an object of this invention to provide in an improved liquid level control a liquid level control valve for controlling return fluid to a primary reservoir and a pressure sensitive valve for controlling fluid flow to and storage in a secondary reservoir.

Another object of this invention is to provide in an improved liquid level control a float control valve which closes the primary reservoir to return fluid when the liquid level therein is above a predetermined level and a pressure sensitive valve which opens in response to the pressure of fluid returning to the primary reservoir to permit temporary storage of excess fluid in the secondary reservoir.

These and other objects and advantages of the present invention will be more apparent from the following description and drawing which is a diagrammatic view of a liquid level control incorporating the present invention.

Referring to the drawing there is shown a primary reservoir 10 to which is secured a valve housing 12. A float 14 is pivotably connected to the valve housing 12 at 16. A valve 18 is formed integrally with or otherwise secured to the float 14 which valve 18 is operative to open and close a fluid passage 20 in the valve housing 12 in response to variations of the liquid level in reservoir 10.

The valve housing 12 also includes a restricted passage 22 which is in fluid communication with the passage 20 via a chamber 24, the passage 20 is of larger diameter than passage 22, such that for a given pressure differential the flow through passage 20 will be greater than the flow through passage 22. The valve housing 12 also includes a valve bore 26 in which is slidably disposed a slidable valve 28. A compression spring 30 is positioned between the valve 28 and a pin 32 secured in the valve body 12. The compression spring 30 is operative to urge the valve 28 toward the end 34 of valve bore 26 which is adjacent the chamber 24.

The valve bore 26 is also in fluid communication with a secondary reservoir passage 36 and a return passage 38. The return passage 38 provides fluid communication between the valve bore 26 and the primary reservoir 10 while the secondary reservoir passage 36 provides fluid communication between the valve bore 26 and a secondary reservoir 40. The valve 28 has sufficient length to prevent simultaneous fluid communication of passageway 36 with chamber 24 and passage 38. Thus, when the valve 28 is in the position shown fluid communication is opened between passage 22 and the secondary reservoir 40 and when the valve 28 is in the position shown by the phantom lines fluid communication is opened between the secondary reservoir 40 and passage 38.

A pump 42 is in fluid communication with the primary reservoir 10 via an inlet passage 44 and with a fluid system 46 via an outlet passage 48. The pump 42 also delivers fluid to the restricted passage 22 via passage 52. The restriction 22 is sized to maintain a sufficient back pressure in passage 52, so that the pressure in system 46 is great enough for the desired operation. The fluid system 46, which can be any of the fluid systems commonly used for automotive vehicles such as an automatic transmission, power steering, power brakes or a combination thereof, has a return passage 54 which returns fluid from the fluid system 46, after it has completed the work required thereby, to the primary reservoir 10. This passage 54 also returns fluid leakage from the fluid system 46. The passage 54 could alternatively be connected to the secondary reservoir 40.

The position of the float 14 of the valve 28 shown in solid lines indicates that the fluid system is operating such that fluid has been drawn from the primary reservoir 10 until a level 56 has been reached. With the fluid level 56 in the primary reservoir 10 the valve 18 closes the passage 20 such that fluid delivered by passage 52 develops sufficient pressure in chamber 24 to move the valve 28 to the position shown so that the fluid can be stored in the secondary reservoir 40. If the fluid system is operating in a steady state condition, the fluid level in reservoir 10 will remain substantially as shown at 56. The valve 18 can be partially opened so that some of the returning fluid in passage 52 will be directed to reservoir 10 while the remaining fluid in passage 52 is directed to reservoir 40. However, should a change in the fluid system 46 occur such as a shift in the power transmission, a steering maneuver or a braking maneuver, the system 46 will accept full flow from the pump 42 such that the liquid level in the primary reservoir 10 will decrease. When the liquid level in the primary reservoir 10 decreases below the level shown at 56, the float 14 will move toward the position shown in phantom lines so that the return passage 20 is opened by the valve 18. With the return passage 20 open the pressure in the chamber 24 will decrease, since passage 20 can accept more fluid than passage 22 can deliver due to the diameter differential therebetween, thus permitting the valve 28 to be moved to the phantom position shown. In the phantom position shown the passage 36 is opened to the primary reservoir 10 by a valve bore 26 and passage 38 so that the fluid stored in the secondary reservoir 40 will return to the primary reservoir 10 to re-establish the desired liquid level therein.

Obviously, many modifications and variations of the present invention are possible in light of the above teachings. It is, therefore, to be understood that within the scope of the appended claims the invention may be practiced otherwise than as specifically described.

What is claimed is:

1. In a fluid system, a primary fluid reservoir; level indicating means in said reservoir for determining the fluid level in said reservoir; return passage means for returning fluid to said primary reservoir; first valve means operatively connected with said level indicating means and responsive thereto for blocking said return passage means when the fluid in said primary reservoir is above a predetermined level; a secondary fluid reservoir; secondary passage means for communicating fluid to and from said secondary reservoir; and second valve means in fluid communication with said return passage means and said secondary passage means being movable in response to fluid pressure in said return passage means when the fluid level in said primary reservoir is above said predetermined level to establish fluid communication between said return and secondary passage means and to establish fluid communication between said secondary passage means and said primary reservoir when the fluid level in said primary reservoir is below said predetermined level.

2. In a fluid system, a primary fluid reservoir; float means in said reservoir movable in response to the fluid level in said reservoir; return passage means for returning fluid to said primary reservoir; first valve means operatively connected with said float means for blocking said return passage means when the fluid in said primary reservoir is above a predetermined level; a secondary fluid reservoir; secondary passage means for communicating fluid to and from said secondary reservoir; second valve means in fluid communication with said return passage means and said secondary passage means being movable in response to fluid pressure in said return passage means when the fluid level in said primary reservoir is above said predetermined level to establish fluid communication between said return passage means and said secondary passage means and to establish fluid communication between said secondary passage means and said primary reservoir when the fluid level in said primary reservoir is below said predetermined level; and pump means for drawing fluid from said primary reservoir for delivery to a system and having valve means operable to deliver excess pump flow to said return passage means.

3. In a fluid system, a primary fluid reservoir; float means in said reservoir movable in response to the fluid level in said reservoir; return means for returning fluid to said primary reservoir including a fluid chamber having a first return passage means for delivering fluid thereto, and a second return passage means of larger diameter than said first return passage means for delivering fluid from said chamber; first valve means operatively connected with said float means for blocking said second return passage means when the fluid in said primary reservoir is above a predetermined level; a secondary fluid reservoir; secondary reservoir passage means for communicating fluid to and from said secondary reservoir; second valve means in fluid communication with said fluid chamber and said secondary reservoir passage means being movable in response to fluid pressure in said fluid chamber when the fluid level in said primary reservoir is above said predetermined level to establish fluid communication between said chamber and secondary reservoir passage means and to establish fluid communication between said secondary reservior passage means and said primary reservoir when the fluid level in said primary reservoir is below said predetermined level.

* * * * *